(No Model.)
P. E. L. PERDRIZET.
GLOVE FASTENING.
No. 574,042. Patented Dec. 29, 1896.
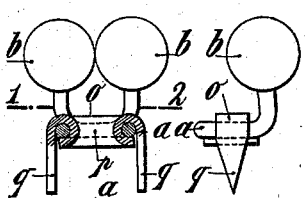
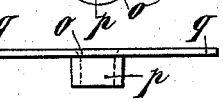
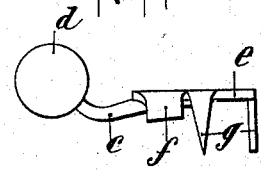
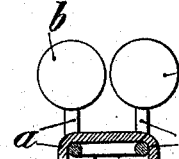
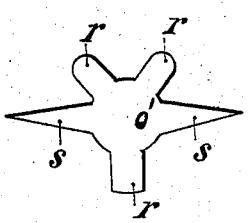
Witnesses:
L. M. Wachschlager,
Geo. E. Moore.
Inventor
Paul E. L. Perdrizet,
By Briesen & Knauth
his Attorneys.
THE NORRIS PETERS CO., PHOTO-LITHO., WASHINGTON, D. C.

UNITED STATES PATENT OFFICE.

PAUL EMILE LÉON PERDRIZET, OF PARIS, FRANCE.

GLOVE-FASTENING.

SPECIFICATION forming part of Letters Patent No. 574,042, dated December 29, 1896.

Application filed January 20, 1896. Serial No. 576,079. (No model.)

*To all whom it may concern:*

Be it known that I, PAUL EMILE LÉON PERDRIZET, of the city of Paris, France, have invented an Improved Fastener Provided with Three Balls or Pearls and its Several Applications, of which the following is a full, clear, and exact description.

My invention relates to a glove-fastening; and it consists in the construction and arrangement hereinafter set forth and claimed.

The object of my invention is to produce a flexible elastic fastening device of the three-ball clasp type. That is to say, one of the members of the fastening device carries two balls and the other member of the fastening device carries a single ball, the said three balls producing a lock in a well-known manner.

My invention will be understood by referring to the accompanying drawings, in which—

Figure 1 is a side view of a member of a fastening device constructed according to my invention and carrying two balls. Fig. 2 is a sectional front view thereof, showing the attaching-plate for attaching or fastening the two-ball member to the glove. Fig. 3 is a section on line 1 2 of Fig. 2, and Fig. 4 is an edge view of the attaching or fastening plate in its unbent condition. Fig. 5 is a sectional front view of another type of two-ball fastener constructed according to my invention. Fig. 6 is a bottom view thereof. Fig. 7 is a side view of a one-ball member of my fastening, and Fig. 8 is a detail plan view of the blank forming the attaching-plate shown in Figs. 5 and 6.

Referring now particularly to Figs. 1 to 4, it will be noted that the two-ball fastener member is composed of two parts, one part consisting of a wire coiled portion $a$, whose free ends extend upwardly from the plane of the coil and terminate in balls $b\ b$. Entering this wire coil is the cylinder $p$ of the attaching or fastening plate $o$, which cylinder $p$ is flared outwardly, as shown in Fig. 2, in order to retain the attaching-plate in the coil. The prongs $q$ of the attaching or fastening plate $o$ are bent so as to enter and be clenched on the material of the glove.

In Figs. 5 and 6 I have shown a similar two-ball member consisting of a wire coil $a$, whose free ends extend upward from the plane of the coil and terminate in balls $b\ b$, which wire coil is secured by an attaching or fastening plate $o'$. (Shown clearly in Fig. 8.) This attaching-plate $o'$ is secured to the coil $a$ by prongs $r$, which are turned over the coil, and is provided with prongs $s\ s$, which enter and are clasped or clenched to the material of the glove.

In Fig. 7 I have shown the one-ball member of the fastening, which may coöperate with either of the two-ball members previously described. This one-ball member is shown as consisting of a stem $c$, carrying a ball $d$. This stem $c$ is secured to an attaching-plate $e$ by a lug $f$, which surrounds the stem $c$, the said attaching-plate $e$ being also provided with prongs $g$ for securing it to a glove or other article.

What I claim, and desire to secure by Letters Patent, is—

1. In a three-ball fastening device, the combination with a one-ball member, of a two-ball member comprising a resilient wire coil having its free ends extending upwardly from the plane of the coil, balls $b\ b$ carried one upon each of the free ends of the coil, and a fastening clamping the wire coil and provided with prongs to enter the material of the glove or other garment, substantially as described.

2. In a three-ball fastening device, the combination with a one-ball member, of a two-ball member comprising a wire coil having free ends, balls $b\ b$ carried each upon one of the free ends of the coil and a fastening-plate comprising a tubular section $p$ entered into the coil and flared outwardly to hold the said fastening-plate to the coil and attaching-prongs $q$ for attaching the said two-ball member to a glove or other garment.

The foregoing specification of my improved fastener provided with three balls or pearls and its several applications signed by me this 31st day of December, 1895.

PAUL EMILE LÉON PERDRIZET.

Witnesses:
CLYDE SHROPSHIRE,
ALBERT MOREAU.